(12) United States Patent
Ogawa

(10) Patent No.: US 7,443,425 B2
(45) Date of Patent: Oct. 28, 2008

(54) IMAGE PICKUP APPARATUS, CONTROL METHOD THEREFOR, CONTROL PROGRAM FOR IMPLEMENTING THE CONTROL METHOD, AND STORAGE MEDIUM STORING THE CONTROL PROGRAM

(75) Inventor: Shigeo Ogawa, Kawasaki (JP)

(73) Assignee: Canon Kabushiki Kaisha (JP)

( * ) Notice: Subject to any disclaimer, the term of this patent is extended or adjusted under 35 U.S.C. 154(b) by 683 days.

(21) Appl. No.: 11/063,364

(22) Filed: Feb. 23, 2005

(65) Prior Publication Data
US 2005/0185064 A1 Aug. 25, 2005

(30) Foreign Application Priority Data
Feb. 24, 2004 (JP) ............................. 2004-047798

(51) Int. Cl.
*G03B 7/00* (2006.01)
*H04N 5/235* (2006.01)
*H04N 5/238* (2006.01)

(52) U.S. Cl. ..................... 348/221.1; 348/345; 348/362

(58) Field of Classification Search ................ 348/349, 348/369, 221.1, 345, 362–366
See application file for complete search history.

(56) References Cited
U.S. PATENT DOCUMENTS 4,053,907 A * 10/1977 Iwata et al. .................. 396/235
4,748,468 A * 5/1988 Fujino et al. ................. 396/121
4,792,820 A * 12/1988 Norita et al. ................. 396/130
5,006,877 A * 4/1991 Katoh et al. ................. 396/130
5,382,996 A * 1/1995 Kadohara .................... 396/109
6,240,256 B1 * 5/2001 Hozumi et al. .............. 396/223
6,757,020 B1 * 6/2004 Kikuchi ................. 348/333.01

FOREIGN PATENT DOCUMENTS

| JP | 2640248 B2 | 5/1997 |
| JP | 2001-069401 A | 3/2001 |
| JP | 2002-314876 A | 10/2002 |

* cited by examiner

*Primary Examiner*—David Ometz
*Assistant Examiner*—Tuan H Le
(74) *Attorney, Agent, or Firm*—Rossi, Kimms & McDowell LLP

(57) ABSTRACT

An image pickup apparatus which makes it possible to obtain a suitable exposure value even if the brightness of the subject changes just before photography preparations and is capable of achieving both of acceleration of photography preparations and high precision exposure control. A ranging control section 42 carries out focus detection control on a subject image in a plurality of control modes. An exposure control section 40 repeatedly carries out feedback exposure control of the subject image so as to maintain proper brightness of an image obtained from an image pickup device 14. A system control circuit 50 controls the exposure control section 40 so as to carry out the feedback exposure control before execution of the focus detection control according to a selected one of the control modes of the raging control section.

8 Claims, 9 Drawing Sheets

FIG. 8

|  | AF MODE ||
|  | SINGLE AF | CONTINUOUS AF |
| --- | --- | --- |
| AE AT TIME OF SW1 PRESSING | × | ○ |
| POST AF PHOTOMETRIC OPERATION | ○ | × |

IMAGE PICKUP APPARATUS, CONTROL METHOD THEREFOR, CONTROL PROGRAM FOR IMPLEMENTING THE CONTROL METHOD, AND STORAGE MEDIUM STORING THE CONTROL PROGRAM

BACKGROUND OF THE INVENTION

1. Field of the Invention

The present invention relates to an image pickup apparatus for a digital camera or the like, a control method therefor, a control program for implementing the control method, and a storage medium storing the control program.

2. Description of the Related Art

Conventionally, there has been known a digital camera in which an optical image of a subject taken in by a taking lens is photoelectrically converted into an analog video signal by an image pickup device. Image processing is carried out on the analog video signal, thereby generating digital image data.

Generally, this kind of digital camera measures the brightness of the subject in pre-photography preparations from the video signal, and based on the measurement results, automatic exposure control processing (hereinafter referred to as "AE processing") is carried out to obtain a suitable exposure value. Then, automatic focus detection processing (hereinafter referred to as "AF processing") is carried out to drive a focus-adjusting lens so that the subject is focused. The subject brightness value is metered from the video signal again, and photographic exposure conditions are thereby determined.

Two kinds of AF processing methods, i.e. continuous AF processing and single AF processing, are commonly known. The continuous AF processing continuously repeats focus detection until just before photography preparations commence during operation of electronic finder function. The single AF processing carries out focus detection only once, at the time the photography preparations are instructed. Further, conventionally, two kinds of AE processing methods, i.e. feedback AE processing and scanning AE processing, are also known. The feedback AE processing carries out exposure control so as to maintain suitable brightness of a repeatedly photographed subject while determining photographic exposure conditions, whereas the scanning AE processing uses a plurality of predetermined exposure values so as to cope with any sudden changes in brightness, carries out exposure control, and determines photographic exposure conditions.

In conventional AE processing, a method has been proposed that, for the purpose of photographing with a constantly suitable exposure, carries out exposure control by selectively using the feedback control method and the scanning control method (refer to Japanese Laid-Open Patent Publication (Kokai) No. 2002-314876, for example).

However, the above-described conventional digital camera commonly omits the AE processing so that it can carry out the AF processing at the beginning of the photography preparations. When employing such a control method, however, it is impossible to cope with any sudden changes in brightness occurring just before the start of photography preparations, and thereby no suitable exposure value can be obtained.

In carrying out the continuous AF processing in particular, because more control time is allotted to the AF processing than the AE processing during operation of the electronic finder function, the AE processing control period becomes accordingly longer. Thus, there are cases where the exposure status at the beginning of photography preparations is unsuitable. Accordingly, when the continuous AF processing switches over to photography preparations, if a control method is adopted that omits the AE processing carried out during the beginning of photography preparations, photography is carried out without a suitable exposure value.

SUMMARY OF THE INVENTION

It is an object of the present invention to provide an image pickup apparatus and a control method therefor, and a control program for implementing the control method that make it possible to obtain a suitable exposure value even if the brightness of the subject changes just before photography preparations and that are capable of achieving both acceleration of photography preparations and high precision exposure control, as well as a control program for implementing the control method and a storage medium storing the control program.

To attain the above object, in a first aspect of the present invention, there is provided an image pickup apparatus comprising an image pickup unit that picks up a subject image, a focus detection control unit that carries out focus detection control on the subject image in a plurality of control modes, a feedback exposure control unit that repeatedly carries out feedback exposure control of the subject image so as to maintain proper brightness of an image obtained from the image pickup unit, and an execution control unit that controls the feedback exposure control unit so as to carry out the feedback exposure control before execution of the focus detection control according to a selected one of the control modes of the focus detection control unit.

Preferably, the image pickup apparatus comprises a switch that instructs a start of photography operation, and the execution control unit is operable when the switch instructs the start of photography processing, to control the feedback exposure control unit so as to carry out the feedback exposure control before execution of the focus detection control according to the selected one of the control modes of the focus detection control unit.

Also preferably, the focus detection control unit has a first control mode in which the focus detection control is carried out once every time a photography preparation operation is carried out, and a second control mode in which the focus detection control is consecutively carried out a plurality of times every time the photography preparation operation is carried out, and the execution control unit is operable when the focus detection control unit carries out the focus detection control in the first control mode, to control the feedback exposure control unit so as to carry out the feedback exposure control after the focus detection control unit carries out the focus detection control.

More preferably, the image apparatus comprises a switch that instructs a start of photography operation, and the execution control unit is operable when the switch instructs the start of photography processing, to control the feedback exposure control unit so as to carry out the feedback exposure control before execution of the focus detection control according to the selected one of the control modes of the focus detection control unit.

Alternatively, the focus detection control unit has a first control mode in which the focus detection control is carried out once every time a photography preparation operation is carried out, and a second control mode in which the focus detection control is consecutively carried out a plurality of times every time the photography preparation operation is carried out, and wherein the execution control unit is operable when the focus detection control unit carries out the focus detection control in the second control mode, to control the feedback exposure control unit so as to carry out the feedback exposure control before execution of the focus detection control, and the execution control unit is operable when the focus detection control unit carries out the focus detection control in the first control mode, to control the feedback exposure control unit so as not to carry out the feedback exposure control before execution of the focus detection control.

To attain the above object, in a second aspect of the present invention, there is provided an image pickup apparatus comprising an image pickup unit that picks up a subject image, a focus detection control unit having a first control mode in which the focus detection control is carried out once every time a photography preparation operation is carried out on the subject image, and a second control mode in which the focus detection control is consecutively carried out a plurality of times every time the photography preparation operation is carried out on the subject image, a feedback exposure control unit that repeatedly carries out feedback exposure control of the subject image so as to maintain proper brightness of an image obtained from the image pickup unit, and an execution control unit that is operable when the focus detection control unit carries out the focus detection control in the first control mode, to control the feedback exposure control unit so as to carry out the feedback exposure control after execution of the focus detection control, and operable when the focus detection control unit carries out the focus detection control in the second control mode, to control the feedback exposure control unit so as to carry out the feedback exposure control before execution of the focus detection control.

To attain the above object, in a third aspect of the present invention, there is provided a method of controlling an image pickup apparatus comprising an image pickup unit that picks up a subject image, a focus detection control unit that carries out focus detection control on the subject image in a plurality of control modes, and a feedback exposure control unit that repeatedly carries out feedback exposure control of the subject image so as to maintain proper brightness of an image obtained from the image pickup unit, comprising a selection step of selecting one control mode from the plurality of control modes of the focus detection control unit, and a determination step of determining whether to carry out the feedback exposure control by the feedback exposure control unit before execution of the focus detection control according to the control mode of the focus detection control unit selected in the selection step.

To attain the above object, in a fourth aspect of the present invention, there is provided a program for causing a computer to execute a method of controlling an image pickup apparatus comprising an image pickup unit that picks up a subject image, a focus detection control unit that carries out focus detection control on the subject image in a plurality of control modes, and a feedback exposure control unit that repeatedly carries out feedback exposure control of the subject image so as to maintain proper brightness of an image obtained from the image pickup unit, the method comprising a selection step of selecting one control mode from the plurality of control modes of the focus detection control unit, and a determination step of determining whether to carry out the feedback exposure control by the feedback exposure control unit before execution of the focus detection control according to the control mode of the focus detection control unit selected in the selection step.

To attain the above object, in a fifth aspect of the present invention, there is provided a computer-readable storage medium storing a program for causing a computer to execute a method of controlling an image pickup apparatus comprising an image pickup unit that picks up a subject image, a focus detection control unit that carries out focus detection control on the subject image in a plurality of control modes, and a feedback exposure control unit that repeatedly carries out feedback exposure control of the subject image so as to maintain proper brightness of an image obtained from the image pickup unit, the method comprising a selection step of selecting one control mode from the plurality of control modes of the focus detection control unit, and a determination step of determining whether to carry out the feedback exposure control by the feedback exposure control unit before execution of the focus detection control according to the control mode of the focus detection control unit selected in the selection step.

According to the present invention, it is possible to obtain a suitable exposure value even if the brightness of the subject changes just before photography preparations (just before the start of a shooting operation). Further, both acceleration of photography preparations and high precision exposure control can be achieved.

The above and other objects, features, and advantages of the invention will become more apparent from the following detailed description taken in conjunction with the accompanying drawings.

BRIEF DESCRIPTION OF THE DRAWINGS

FIG. 8 is a diagram showing a table used for switching exposure control methods.

DETAILED DESCRIPTION OF THE PREFERRED EMBODIMENTS

The present invention will now be described in detail with reference to the drawings showing a preferred embodiment thereof. The image pickup apparatus according to the preferred embodiment is applied to a digital camera.

Figure 1:
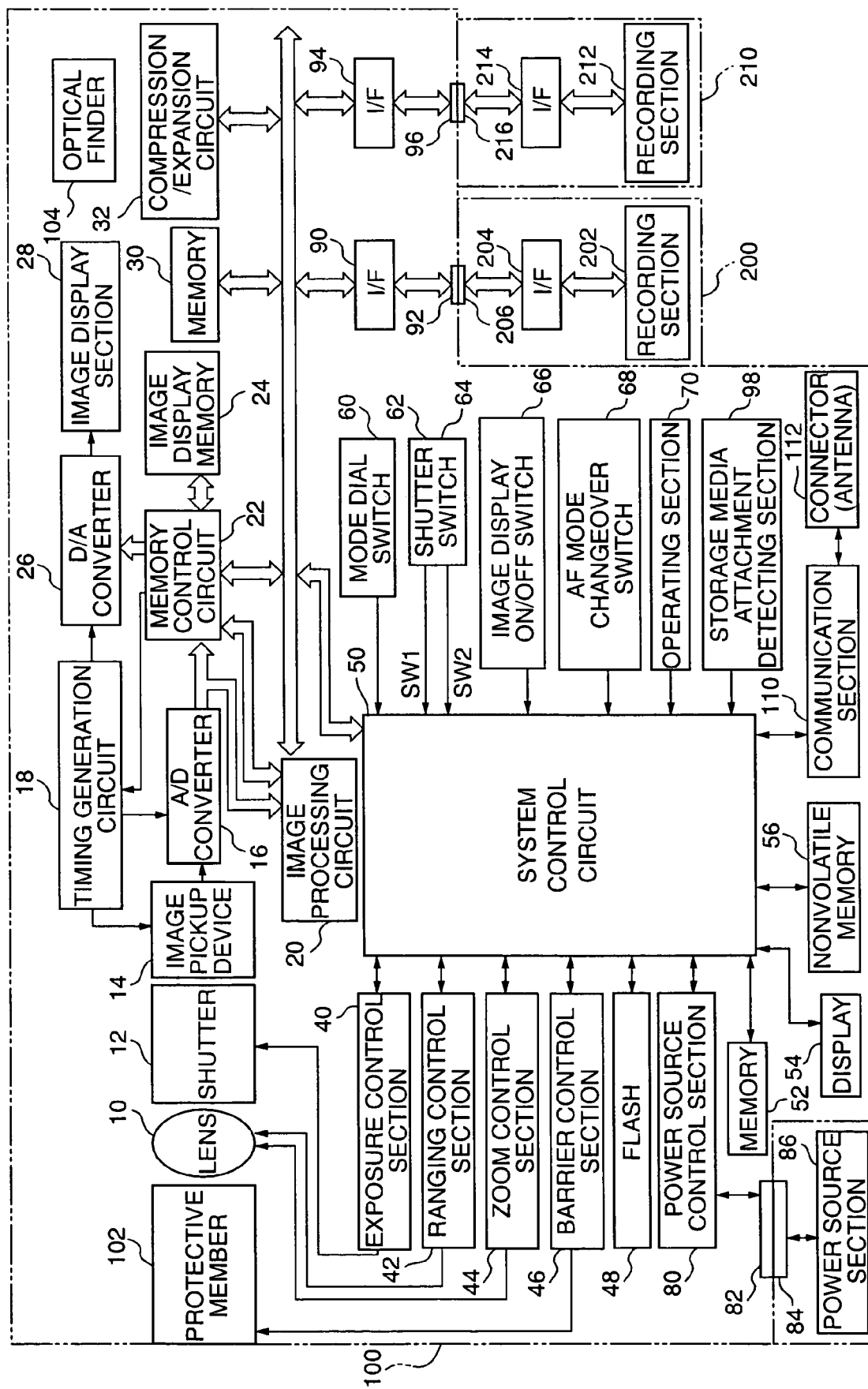
FIG. 1 is a block diagram showing the construction of an image pickup apparatus according to an embodiment of the present invention.

FIG. 1 is a block diagram showing the construction of an image pickup apparatus according to the embodiment of the present invention.

As shown in FIG. 1, the image pickup apparatus 100 according to the present embodiment is comprised of a taking lens 10, a shutter 12 having a stop function, an image pickup device 14 that converts an optical image into an electric signal, an A/D converter 16 that converts an analog output signal from the image pickup device 14 into a digital signal, a timing generation circuit 18 that supplies a clock signal and a control signal to the image pickup device 14, the A/D converter 16, and a D/A converter 26, and an image processing circuit 20. The timing generation circuit 18 is controlled by a memory control circuit 22 and a system control circuit 50. The image processing circuit 20 carries out a predetermined image pixel interpolation and a color conversion process on data from the A/D converter 16 or data from the memory control circuit 22.

The image pickup apparatus 100 carries out a TTL (Through The Lens) AF control process, an AE control process, and an EF (Evaluative Flash) control process. These control processes are performed such that the image processing circuit 20 carries out predetermined calculation processing using picked up image data, and the system control circuit 50 controls an exposure control section 40 and a ranging control section 42 based on the obtained calculation results. Further, the image processing circuit 20 carries out predetermined calculation processing using the picked up image data, and also carries out TTL AWB (Auto White Balance) processing based on the obtained calculation results.

The memory control circuit 22 controls the A/D converter 16, the timing generation circuit 18, the image processing circuit 20, an image display memory 24, the D/A converter 26, a memory 30, and a compression/expansion circuit 32. The data from the A/D converter 16 is written into the image display memory 24 or the memory 30 through the image processing circuit 20 and the memory control circuit 22, or directly through the memory control circuit 22.

Furthermore, the image pickup apparatus 100 has the image display memory 24, the D/A converter 26, and an image display section 28 implemented by a TFTLCD or the like. Image display data written into the image display memory 24 is displayed by the image display section 28 through the D/A converter 26. The electronic finder function can be implemented by sequentially displaying photographed images using the image display section 28. The image display section 28 can be turned on and off according to instructions from the system control circuit 50. When the image display is turned off, the power consumption of the image pickup apparatus 100 can be greatly reduced.

The memory 30 stores both photographed still image data and moving image data and is provided with a storage capacity sufficient to store still image data corresponding to a predetermined number of still images and store moving image data corresponding to a predetermined time period of moving images. This enables a large amount of image data to be written into the memory 30 at a high speed even in the case of panoramic photography or rapid photography in which a plurality of still images are continuously photographed. Further, the memory 30 can also be used as a working area for the system control circuit 50.

The compression/expansion circuit 32 compresses and decompresses image data by means such as Adaptive Discrete Cosine Transform (ADCT), reads out image data stored in the memory 30, carries out compression processing or decompression processing on the read data, and writes the processed data into the memory 30.

Connected to the system control circuit 50 that controls the entire image pickup apparatus 100 are a memory 52 that stores constants, variables, and programs for operations of the system control circuit 50, and a display 54 comprised of a speaker and a liquid crystal display device that displays an operative status and messages via words, images, sounds, etc.

The memory 52 also stores program diagrams used by AE processing. The program diagrams are tables defining the relationship of a diaphragm aperture variable and a shutter speed control variable to an exposure value. The display 54 is placed at one or a plurality of such locations in the vicinity of an operating section 70 of the image pickup apparatus 100 that the display 54 is visible to the operator and is comprised of a combination of, for example, a LED, LCDs, and a sounding device. Moreover, the display 54 has part of its functions disposed in an optical finder 104.

Of the contents displayed by the display 54, the contents displayed by the LCDs include an exposure correction display, an error display, a display for several kinds of warnings, a battery residual capacity display, a display indicating the attached or removed status of a storage medium 200 and a storage medium 210, a date/time display, etc. Further, of the contents displayed by the display 54, the contents displayed inside the optical finder 104 include a focus display, a flash charge display, a shutter speed display, a stop value display, an exposure correction display, etc.

Further connected to the system control circuit 50 are the exposure control section 40, the ranging control section 42, a zoom control section 44, a barrier control section 46, a flash 48, a nonvolatile memory 56, a mode dial switch 60, shutter switches 62 and 64, an image display on/off switch 66, an AF mode changeover switch 68, the operating section 70, and a power source control section 80.

The exposure control section 40 controls the shutter 12 that has a stop function and has a flash compensation function which is performed in cooperation with the flash 48. The ranging control section 42 controls the focusing of the taking lens 10, and the zoom control section 44 controls the zooming of the taking lens 10. The barrier control section 46 controls the operation of a protective member 102 as a barrier.

The flash 48 has a function of floodlighting an AF assist light and a flash compensation function. The exposure control section 40 and the ranging control section 42 are controlled using the TTL method. The system control circuit 50 controls the exposure control section 40 and the ranging control section 42 based on results of calculation using the photographed image data by the image processing circuit 20. The nonvolatile memory 56 can be electrically erased or store data and is implemented by, for example, EEPROM.

The mode dial switch 60 switches between functional modes such as a power off mode, an automatic photography mode, a regular photography mode, a panoramic photography mode, a playback mode, a multi-screen playback or erase mode, and a PC connection mode. The shutter switch 62 (SW1) turns on in the middle of operation of a shutter button, not shown, to instruct the start of such operations as the AF processing, the AE processing, AWB (Auto White Balance) processing, and EF (Evaluative Flash) processing. The shutter switch 64 (SW2) turns on upon completion of shutter button operation to instruct the start of a sequence of processes, i.e. an exposure process for writing signals generated from the image pickup device 14 into the memory 30 via the A/D converter 16 and the memory control circuit 22, a developing process using calculations by the image processing circuit 20 and the memory control circuit 22, a recording process for reading image data from the memory 30, compressing/expanding the image data by the compression/expansion circuit 32 and writing the image data into a storage medium 200 or a storage medium 210.

The image display on/off switch 66 turns the image display section 28 on or off. The image display on/off switch 66 can shut off the supply of current to the image display section 28, which is implemented by TFFLCD or the like, for power saving when carrying photography using the optical finder 104.

The AF mode changeover switch 68 selectively sets a continuous AF processing mode in which focus detection is continuously repeated during operation of the electronic finder function and a single AF processing mode in which focus detection (AF) is carried out only once at the time of photography preparations. The operating section 70 is comprised of various buttons and touch panels, for example, a menu button and a set button, an exposure correction button, and a date/time set button.

The power source control section 80 is comprised of a battery detection circuit, a DC-DC converter, and a switch circuit that switches blocks to be supplied with power. The power source control section 80 carries out battery attachment detection, battery type detection, and battery residual capacity detection, and based on the results of the detections and instructions from the system control circuit 50, controls the DC-DC converter to supply required voltage to various parts over required periods of time.

Further, the image pickup apparatus 100 is provided with a connector 82 and a connector 84 for connecting to a power source 86. The power source 86 is implemented by a primary battery such as an alkali battery and a lithium battery, a secondary battery such as a NiCd battery, a NiMH battery, and a Li battery, or an AC adapter.

Moreover, the image pickup apparatus 100 has interfaces (I/F) 90 and 94 that provide interface with the storage media 200 and 210 such as a memory card and a hard disk. The storage media 200 and 210 can be connected to the interfaces (I/F) 90 and 94 though connectors 92 and 96. The storage medium 200 is comprised of a recording section 202 implemented by a semiconductor memory or a magnetic disk, an interface 204 that provides interface with the image pickup apparatus 100, and a connector 206 for connection with the image pickup apparatus 100. In the same manner, the storage medium 210 is comprised of a recording section 212 implemented by a semiconductor memory or a magnetic disk, an interface 214 that provides interface with the image pickup apparatus 100, and a connector 216 for connection with the image pickup apparatus 100.

Also connected to the system control circuit 50 is a storage medium attachment detecting section 98 that detects whether or not the connector 92 and/or the connector 96 are installed in the storage medium 200 or the storage medium 210.

Although in the present embodiment has two systems of interfaces and connectors for attachment of storage media (the interfaces (I/F) 90 and 94 and the connectors 92 and 96), therein, a single such system or a plurality of such systems may be provided. Further, a combination of interfaces and/or connectors with different standards may be used. The interfaces and connectors may also be ones conforming the standards of PCMCIA card and CF card (compact flash™ card (registered trademark)). Furthermore, in the case where the interfaces 90 and 94 and connectors 92 and 96 conform to the PCMCIA card and CF card standards, various communication cards such as a LAN card, a modem card, a USB card, an IEEE 1394 card, a P1284 card, a SCSI card, or a PHS (personal handyphone system; a cordless telecommunication system) can be connected to the connectors 92 and 96 to make it possible to transmit image data and management information attached to the image data between peripherals such as computers and printers.

Moreover, the image pickup apparatus 100 is comprised of the protective member 102, the optical finder 104, and the display 54, as mentioned above, as well as a communication member 110, and a connector (antenna) 112. The protective member 102 covers the image pickup section including the taking lens 10 of the image pickup apparatus 100 to serve as a barrier that prevent contamination of and damage to the image pickup section. With the image pickup apparatus 100 it is possible to take photographs using only the optical finder 104 and without using the electronic finder function of the image display section 28. Further, the optical finder 104 is capable of performing part of the display functions of the display 54, for example, a focus indication, a hand shaking warning indication, a flash charge indication, a shutter speed indication, a stop value indication, an exposure correction indication.

The communication section 110 has many types of communication functions, such as RS232C, USB, IEEE1394, P1284, SCSI, modem, LAN, and wireless functions. The connector (antenna) 112 connects the image pickup apparatus 100 to other machinery via the communication section 110 (and in the case of wireless communication, the connector 112 is used as an antenna).

Figure 2:
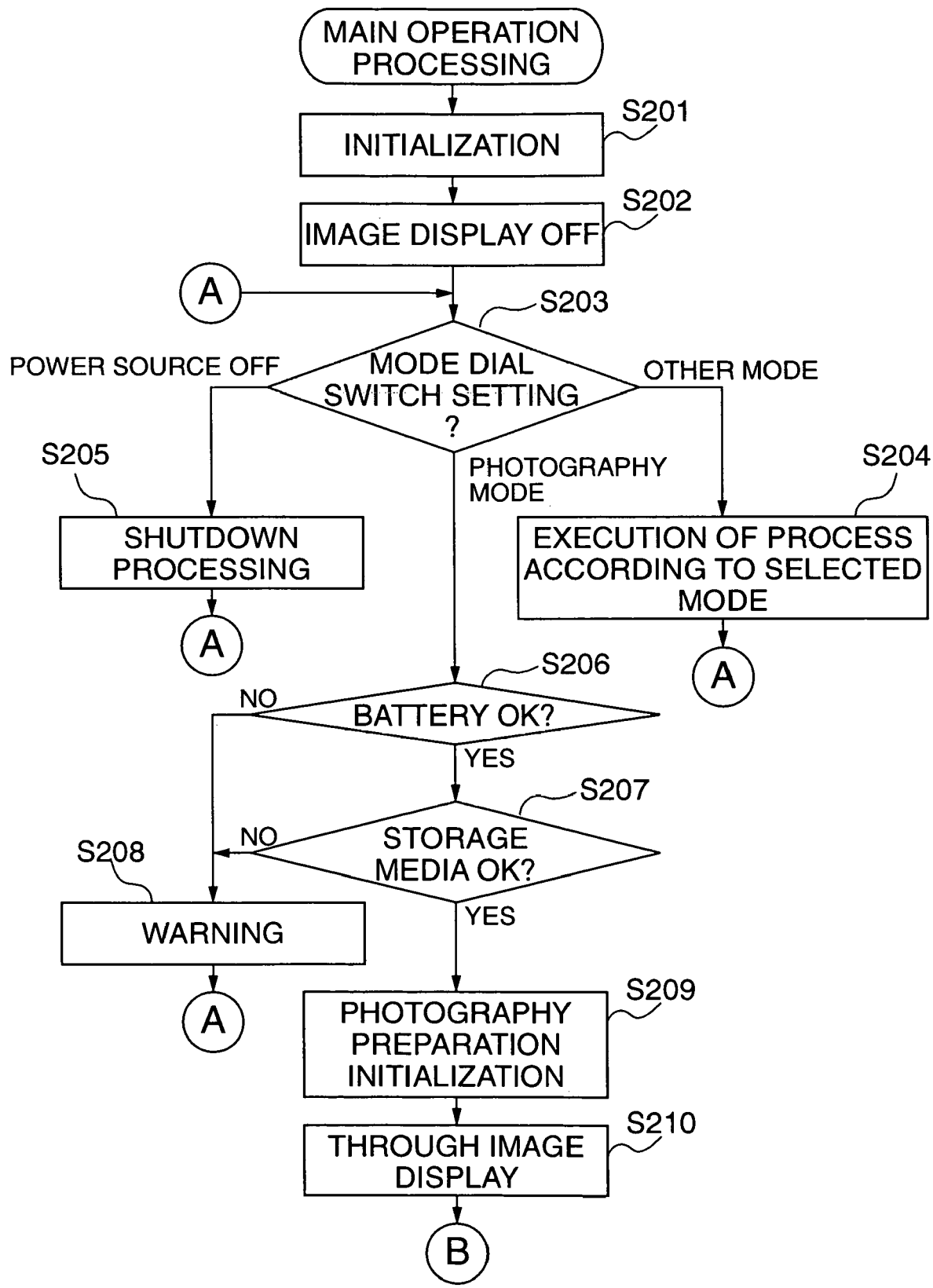
FIG. 2 is a flowchart showing a main routine executed by the image pickup apparatus in FIG. 1.
Figure 3:
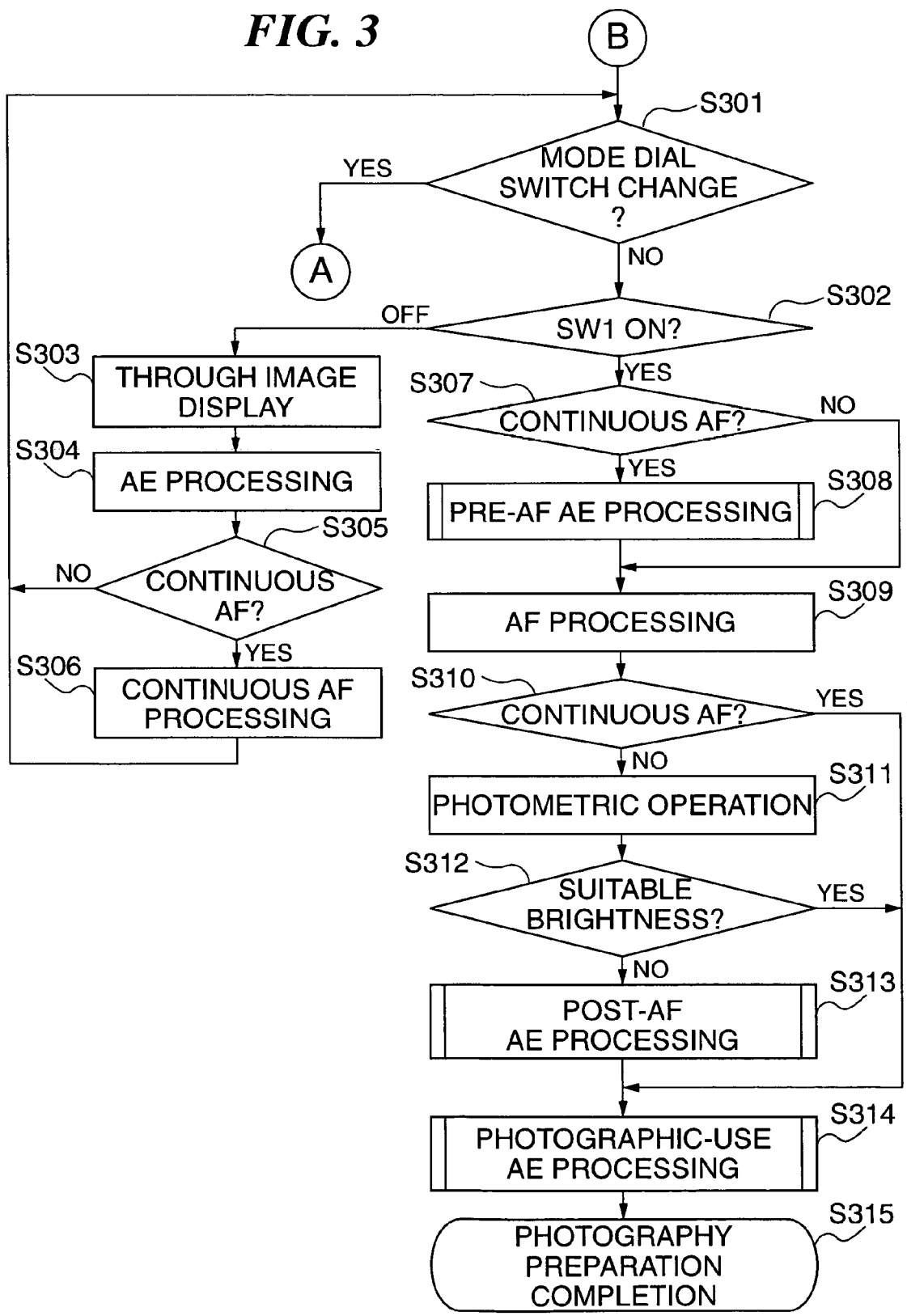
FIG. 3 is a flowchart showing a continued part of the main routine in FIG. 2.

Next, main operations of the image pickup apparatus 100 will be described with reference to FIGS. 2 and 3. FIGS. 2 and 3 are flowcharts showing a main routine executed by the image pickup apparatus 100.

Upon turning on of the power source, the system control circuit 50 initializes flags, control variables, etc. (step S201), and then initializes the image display of the image display section 28 into an off state (step S202). Then, the system control circuit 50 determines the set position of the mode dial switch 60 (step S203). If the mode dial switch 60 is set to the power off position, the image display section 28 and the display 54 are each switched off, and the protective member 102 barrier is closed. Also, necessary parameters such as flags and control variables, set values, and setting modes are stored in the nonvolatile memory 56. The power source control section 80 carries out predetermined processing for shutting down unnecessary power to various parts of the image pickup apparatus 100, including the image display section 28, and other predetermined shutdown processes (step S205), followed by the process returning to the step S203.

If it is determined in the step S203 that the mode dial switch 60 is set to a photography mode, then the process proceeds to a step S206. If it is determined in the step S203 that the mode dial switch 60 is set to another mode, the system control circuit 50 then carries out processing according to the selected mode (step S204), and upon completion of the processing, the process then returns to the step S203.

In the step 206, the system control circuit 50 determines from the status of the power source control section 80 whether or not there are problems with the residual capacity of the battery of the power source section 86 and the operative status of the same. If there is any problem, the display 54 is used to give a predetermined visual or aural warning (step S208), followed by the process returning to the step S203.

If it is determined in the step S206 that there is no problem with the power source section 86, the system control circuit 50 determines whether or not there is any problem with the operative status of the storage medium 200 and the storage medium 210, especially recording and playback of image data into and from the storage medium 200 and the storage medium 210 (step S207). If there is any problem, the display 54 is used to give a predetermined visual or aural warning in the step S208, followed by the process returning to the step S203.

If it is determined in the step S207 that there is no problem with the operative status of the storage medium 200 and the storage medium 210, then the process proceeds to a step S209, wherein initialization of variables used for preparation for photography for displaying a through image (a moving image that has been picked up by the image pickup device 14 to be displayed as a finder function display before and after photographing a still image) on the image display section 28 is carried out. Upon completion of the initialization, the image display section 28 is caused to start the through image display (step S210).

While the through image display is carried out, the electronic finder function is implemented by sequentially displaying data successively written into the image display memory 24 via the image pickup device 14, the A/D converter 16, the image processing circuit 20, and the memory control circuit 22 on the image display section 28 via the memory control circuit 22 and the D/A converter 26.

Next, still photography operations during through image display will be explained with reference to FIG. 3, which is a continuation of the flowchart of FIG. 2.

In a step S301, it is determined whether or not the mode dial switch 60 has been switched. If so, the process returns to the step S203 and the dial state is checked. If the switch 60 has not been switched, then the process proceeds to a step S302. In the step S302, it is determined whether or not the shutter switch SW1 has been pressed, i.e. in the on position. If the switch SW1 has not been pressed, then, in a step S303, processing for continuing the through image display is carried out. Specifically, the image processing circuit 20 carries out a predetermined photometric operation on the signal received from the image pickup device 14 and stores the operation results in the memory 30. Based on the operation results, the system control circuit 50 causes the exposure control section 40 to carry out the AE processing on the through image. Further, when the AF mode changeover switch 68 is set to the continuous AF selecting position (step S305), the continuous AF processing is carried out as processing during the electronic finder function operation (step S306). Specifically, the image processing circuit 20 carries out a predetermined ranging operation on the signal received from the image pickup device 14 and stores the operation results in the memory 30. Based upon the operation results, the system control circuit 50 causes the ranging control section 42 to carry out the AF processing, followed by the process returning to the step S301.

If it is determined in the step S302 that the shutter switch SW1 has been pressed, the process proceeds to a step S307, wherein it is determined whether or not the AF mode changeover switch 68 is set to the continuous AF selecting position. If the switch 68 is set to the continuous AF selecting position, then the AE processing before the AF processing is carried out in a step S308. The details of this AE processing before AF processing will be described by referring to FIG. 4. If the switch 68 is not set to the continuous AF selecting position but to the single AF selecting position, the processing in the step S308 is omitted.

Subsequently, the image processing circuit 20 carries out the predetermined ranging operation on the signal received from the image pickup device 14 and stores the operation results in the memory 30. Based upon the operation results, the system control circuit 50 causes the ranging control section 42 to carry out the AF processing so that the taking lens 10 is focused on the subject (step S309).

Then, in a step S310, it is determined whether or not the AF mode changeover switch 68 is set to the continuous AF selecting position, and if the switch 68 is set to the continuous AF selecting position, the process proceeds to a step S314, described later. When the switch 68 is not set to the continuous AF selecting position, a photometric operation is carried out (step 311). Specifically, the image processing circuit 20 carries out the predetermined photometric operation on the signal received from the image pickup device 14 and stores a brightness value as a result of the photometric operation in the memory 30. If a brightness value previously has been already obtained in the step S308, the brightness value obtained in the step S311 is overwritten onto the previous value.

In a step S312, the photometric operation results obtained by the photometric operation in the step S311 are read from the memory 30. It is determined whether or not the operation results show a suitable brightness value. If the operation results show a suitable brightness value, the process proceeds to a step S313, wherein post-AF processing AE processing is carried out. The details of the post-AF processing AE processing will be described with reference to FIG. 4, referred to later.

Then, AE processing for photography is carried out in a step S314, and completes photography preparations in a step S315. The details of the AE processing for photography will be described with reference to FIG. 5, referred to later.

Figure 4:
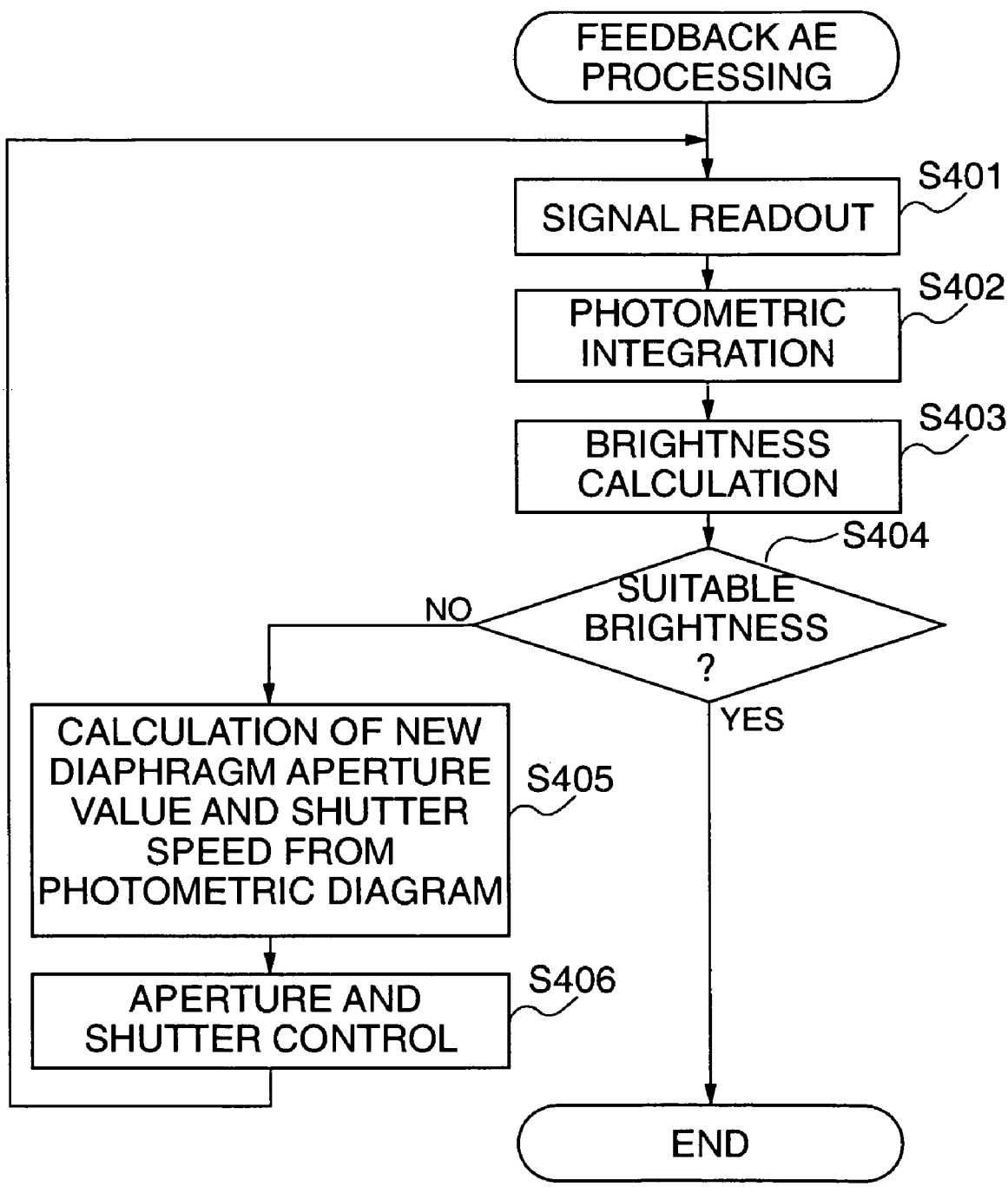
FIG. 4 is a flowchart showing details of a feedback AE process executed in a step S304 in FIG. 3.

FIG. 4 is a flowchart showing the details of the AE processing before the AF processing carried out in the step S308 in FIG. 3 and the post-AF processing AE processing (feedback type AE processing) carried out in the step S313 in FIG. 3.

First, in a step S401, the system control circuit 50 controls the timing generation circuit 18 to output a timing signal, and causes the A/D converter 16 to convert an analog vide signal output the image pickup device 14 into a digital vide signal in synchronism with the timing signal output from the timing generation circuit 18 and store the digital vide signal in the memory 30 (step S401). Then, the image processing circuit 20 is caused to carry out photometric integration on the digital video signal stored in the memory 30. In a step S402, the result of the photometric integration is stored in the memory 30.

Moreover the system control circuit 50 uses the photometric integration result to calculate an average brightness value over an entire screen, and stores the same in the memory 30 (step S403). If a brightness value is already stored in the memory 30, the brightness value obtained in the step S403 is overwritten onto the previously stored brightness value.

Then, it is determined whether or not the average brightness value shows a suitable brightness (step S404). If not, then feedback control is carried out based on the currently obtained brightness value. Specifically, the system control circuit 50 acquires a program diagram for use in photometry, which is stored in the memory 52, and from the brightness value and the program graph for photometry obtained in the step S403 calculates a diaphragm aperture value and a shutter speed to be set for the next photography (step S405).

After this, the system control circuit 50 causes the exposure control section 40 to set the diaphragm aperture and shutter speed obtained in the step S405 (step S406), followed by the process returning to the step S401. The above operations are repeated until a suitable brightness value is obtained in the step S404.

When a suitable brightness value has been obtained, the feedback AE process is completed.

Figure 5:
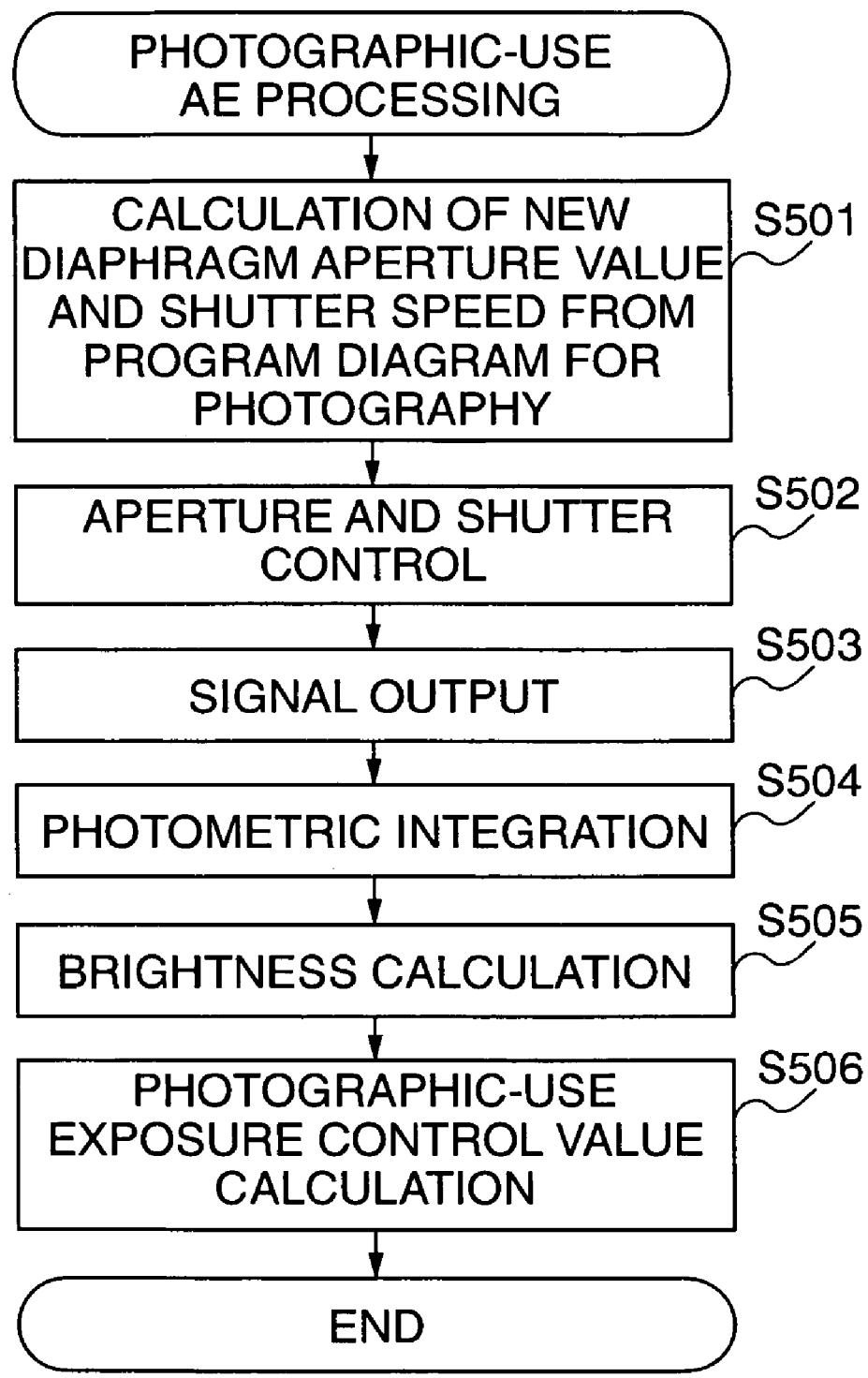
FIG. 5 is a flowchart showing a photographic AE process executed in a step S314 in FIG. 3.

FIG. 5 is a flowchart showing details of the AE processing for photography that is carried out in the step S314 in FIG. 3.

First, in a step S501, the system control circuit 50 reads from the memory 30 the brightness value (first brightness value) obtained by the photometric integration in the step S308, the step S311, or the step S313 in FIG. 3 and reads the program diagram for photography from the memory 52. Then, using the acquired brightness value and the program diagram for photography, the diaphragm aperture value and the shutter speed value for photography are calculated. Then, in a step S502, the system control circuit 50 causes the exposure control section 40 to set the acquired diaphragm aperture value and shutter speed value.

Then, the system control circuit 50 controls the timing generation circuit 18 to output a timing signal, causes the A/D converter 16 to convert an analog video signal output from the image pickup device 14 into a digital video signal in synchronism with the timing signal supplied from the timing generation circuit 18, and stores the digital video signal in the memory 30 (step S503). Then, the image processing circuit 20 carries out photometric integration on the digital video signal stored in the memory 30, and stores the result of the photometric integration in the memory 30 (step S504).

After that, the system control circuit 50 uses the photometric integration results stored in the memory 30 to calculate an average brightness value (second brightness value) over the entire screen, and stores the average value in the memory 30 (step S505). Then, the difference between the second brightness value obtained in the step S505 and the first brightness value stored in the memory 30 is determined, and the determined brightness level difference is converted into a shutter speed. Then, the converted shutter speed, i.e. a shutter speed for correction of the brightness level is added to the shutter speed obtained in the step S501, to thereby determine an exposure control value for use in photography (step S506), followed by terminating the present photographic AE processing.

Figure 6:
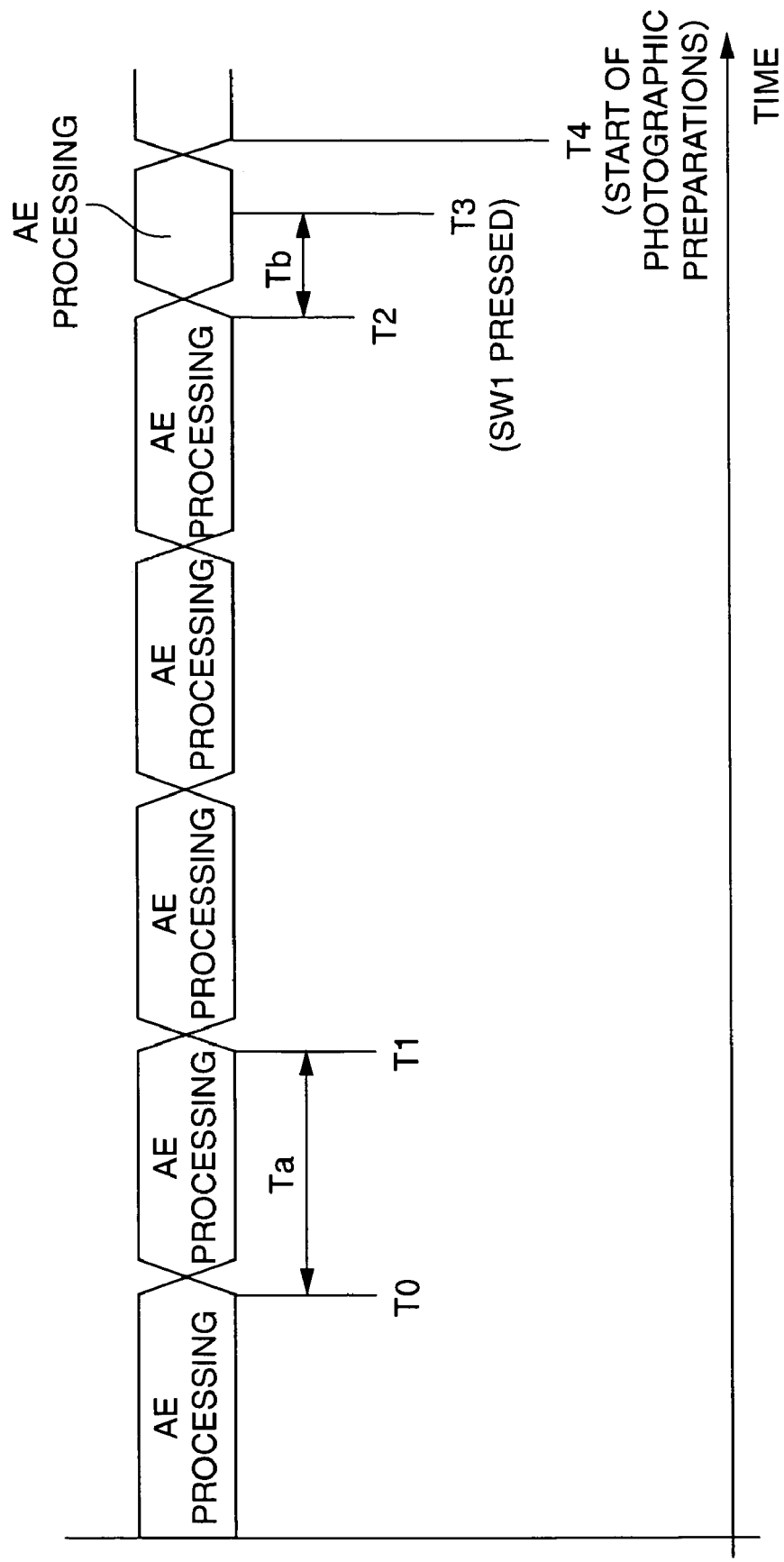
FIG. 6 is a timing chart showing AE processing during execution of an electronic finder function when single AF processing is selected.
Figure 7:
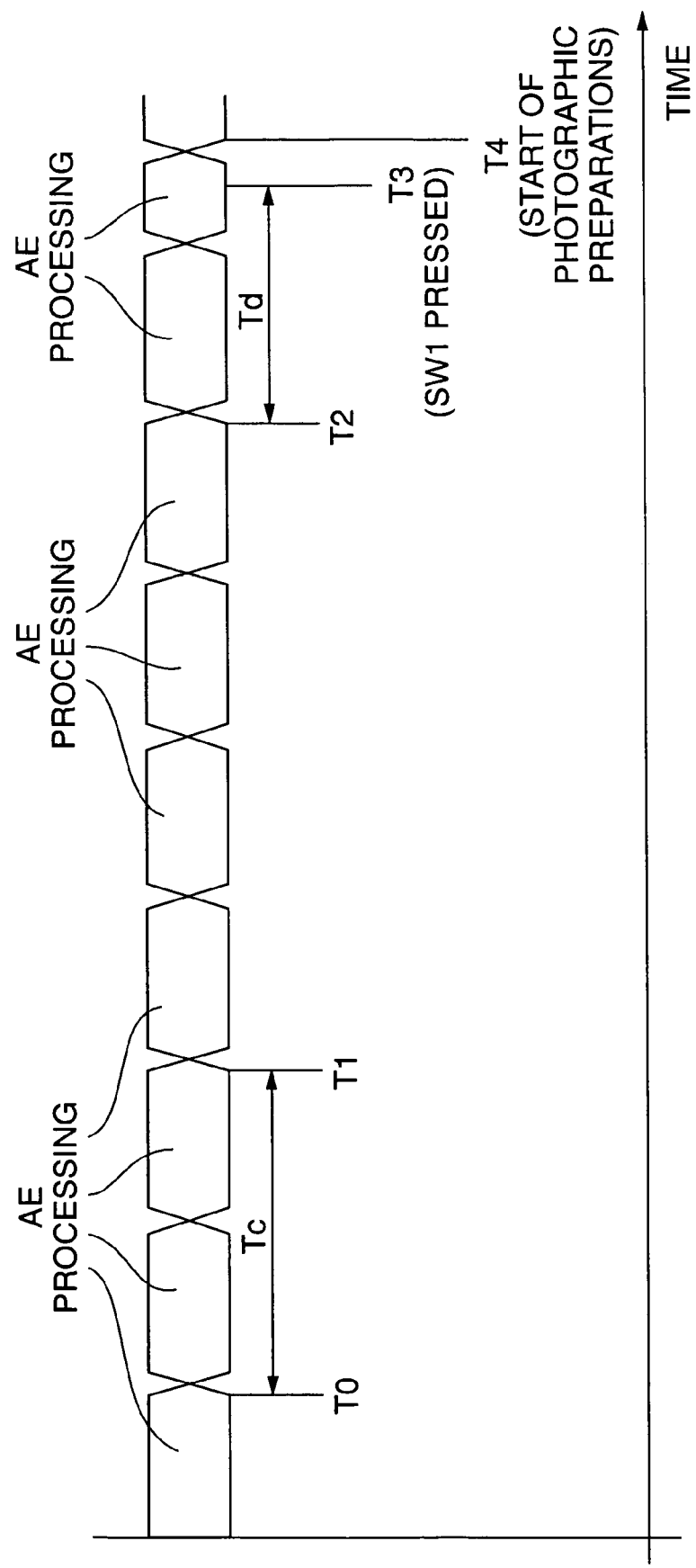
FIG. 7 is a timing chart showing AE processing during execution of the electronic finder execution when continuous AF processing is selected.

FIG. 6 is a timing chart showing the AE processing during execution of the electronic finder function when the single AF processing is selected. FIG. 7 is a timing chart showing the AE processing during execution of the electronic finder execution when the continuous AF processing is selected. Referring to FIGS. 6 and 7, the flowchart in FIG. 3, referred to above, will be described in further detail to supplement the above given description.

As shown in FIG. 6, during execution of the single AF processing, the AE processing is repeatedly carried out. For example, from a time T0 to a time T1, the AE processing is carried out with a control period Ta. If a change in brightness of the subject arises, the AE processing requires a time period Ta at the maximum until the brightness is corrected to a suitable brightness level. If the shutter switch SW1 is pressed at a time T3, a time period Tb is required to pass after the final AE processing is started and until the shutter switch SW1 is pressed. Thus, the time period Tb falls in the range of 0≦Tb≦Ta.

On the other hand, during execution of the continuous AF processing in FIG. 7, where the AF processing is carried out during execution of the electronic finder function, the AF processing and the AE processing are alternately repeatedly executed. The AF processing is executed with a control period Tc which is equal to the sum of a time period of execution of one AF processing and a time period of execution of one AE processing. The control period Tc of AF processing and the control period Ta of AE processing in FIG. 6 are in the relationship of Ta<Tc. If a time period Td is defined as the time period after the final AE processing is started to the time the shutter button SW1 is pressed, then, similarly to the case of FIG. 6, the time period Td is in the range of 0≦Td≦Tc.

Since the control period of AF processing is longer during execution of the continuous AF processing as shown in FIG. 7, there is a possibility that the AF processing result at the time T3 at which the shutter switch SW1 is pressed has degraded reliability.

To address this, as described above, when the AF mode changeover switch 68 is set to the single AF selecting position in the step S307 of FIG. 3, the control as shown in FIG. 6 is carried out, wherein the pre-AF processing AE processing in the step S308 is omitted. On the other hand, when the AF mode changeover switch 68 is set to the continuous AF selecting position in the step S307 in FIG. 3, the control as shown in FIG. 7 is carried out, wherein the pre-AF processing AE processing in the step S308 is executed.

In the above described way, according to the present embodiment, the sequence of the photography preparations when the shutter switch SW1 is pressed is changed depending upon the setting of the AF mode changeover switch 68 such that the pre-AF processing AE processing is omitted when it is unnecessary. As a result, it is possible to reduce the time period required for photography preparations. Moreover, even when the brightness of the subject changes just before the shutter switch SW1 is pressed, post-AF photometric processing is carried out, and if the exposure is unsuitable, the feedback AE processing is carried out, so that the photograph can be carried out with a suitable exposure.

Moreover, when the image display section 28 is turned off by the image display on/off switch 66, the finder operation is switched to the optical finder operation using the optical finder 104. In this case, the same operations are carried out as those when the AF mode changeover switch 68 is set to the continuous AF mode.

Further, even when remote-controlled photography is carried out with the image pickup apparatus 100 body connected to any other apparatus via the communication section 110 and the connector 112, the photography preparation sequence may be changed in the same way as in the flowchart of FIG. 3. Namely, in the case where a remote-controlled finder function is realized with a vide signal transmitted along a communication line, the sequence change is carried out depending on the AF mode, as shown in FIG. 8. Specifically, when the single AF mode is set, the AE processing when the shutter switch SW1 is pressed is not carried out but post-AF photometric processing is carried out. When the continuous AF mode is set, the AE processing when the shutter switch SW1 is pressed is carried out but the post-AF photometric processing is not carried out. Further, even when photographing is carried out with the optical finder using the finder 104 provided in the image pickup apparatus 100 and without using the remote-controlled finder function, the same operations are carried out as those when the AF mode is set to the continuous AF mode.

Next, processing carried out when the shutter switch SW1 and a shutter switch SW2 are consecutively pressed will be described by referring to FIG. 9 that is a further continued part of the flowchart in FIG. 2.

After starting the through display in the step S210 in FIG. 2, first, in a step S701, it is determined whether or not the mode dial switch 60 has been switched. If the switch has been switched, the process returns to the step S203 in FIG. 2 and checks the dial status. If the switch has not been switched, the process proceeds to a step S702.

In the step S702, the status of the shutter switch SW1 is detected, and if the shutter switch SW1 has not been pressed and turned on, processing is carried out for continuing the through image display in a step S706. That is, the image processing circuit 20 carries out a predetermined photometric operation on the signal received from the image pickup device 14 and stores the operation results in the memory 30. The system control circuit 50 carries out AE and AWB on the through image, based on the operation results, and then the process returns to the step S701.

If it is detected in the step S702 that the shutter switch SW1 has been pressed, the status of the shutter switch SW2 is detected in a step S703. If the shutter switch SW2 is in the off position, it is determined whether or not the shutter switch SW1 has been continuously pressed, and if the shutter switch SW1 has been continuously pressed, photography preparation processing is carried out in a step S705. In this preparation processing, the processing shown in FIG. 3 from the step S307 to the step S314 is carried out. On the other hand, if the shutter switch SW1 has not been pressed in the step S704, the process proceeds to a step S706.

When it is detected in the step S702 that the shutter switch SW1 is in the on position and it is detected in the step S703 that the shutter switch SW2 is in the on position, it is determined whether or not the shutter switch SW1 and the shutter switch SW2 have been consecutively pressed in a step S707. The result of the determination is stored in the memory 30. It should be noted that when the photography preparation processing in the step S705 has been carried out, it is not determined that the shutter switch SW1 and the shutter switch SW2 have been consecutively pressed.

When the shutter switch SW1 and the shutter switch SW2 have been consecutively pressed, the process proceeds to a step S708, otherwise, the process proceeds to a step S710. In the step S708, the status of the AF mode changeover switch 68 is detected. Here, if the AF mode changeover switch 68 is set to the single AF mode, the AF processing is carried out in a step S709. If the AF mode changeover switch 68 is set to the continuous AF mode, then the process proceeds to the step S710 without executing the AF processing. In the step S710, the through image displayed on the image display section 28 is interrupted and the process switches to the photography sequence.

In the photography sequence, first, in a step S711, photography processing involving a sequence of photography operations is carried out. In a step S712, color correction processing is carried out as follows. That is, the memory 30 stores therein image data that has been read from the image pickup device 14 through the A/D converter 16 and has not been subjected to signal processing (this image data will be hereinafter referred to as the raw image data). The image processing circuit 20 reads out raw image data from the memory 30 in response to an instruction from the system control circuit 50, and carries out color correction on the read raw image data based on a WB (White Balance) coefficient.

Then, the result of the determination of consecutive pressing of the shutter switch SW1 and the shutter switch SW2 that was stored in the memory 30 in the step S707 is read out. If it is determined in a step S713 that the switches have been consecutively pressed, the process proceeds to a step S714, whereas if the switches have not been consecutively pressed, then the process skips over the step S714 to a step S715.

In the step S714, the amount of digital gain correction as a multiplier coefficient that uniformly changes the digital gain value is calculated for the raw image data. Specifically, the image processing circuit 20 carries out photometric integration on the raw image data stored in the memory 30 in response to an instruction from the system control circuit 50, to calculate an average brightness value. Then, the difference between the calculated average brightness value and a suitable brightness value is determined, to thereby calculate the digital gain correction amount for the raw image data.

In the step S715, predetermined developing and compression processing such as JPEG is carried out, and the resulting image data is stored in the memory 30. At this time, the digital gain correction amount determined in the step S714 is set to the compression/expansion circuit 32 to thereby apply gain to the raw image data.

In the following step S716, the compressed image data stored in the memory 30 in the step S715 is written into the storage medium 200, and the process returns to the step S706.

Figure 9:
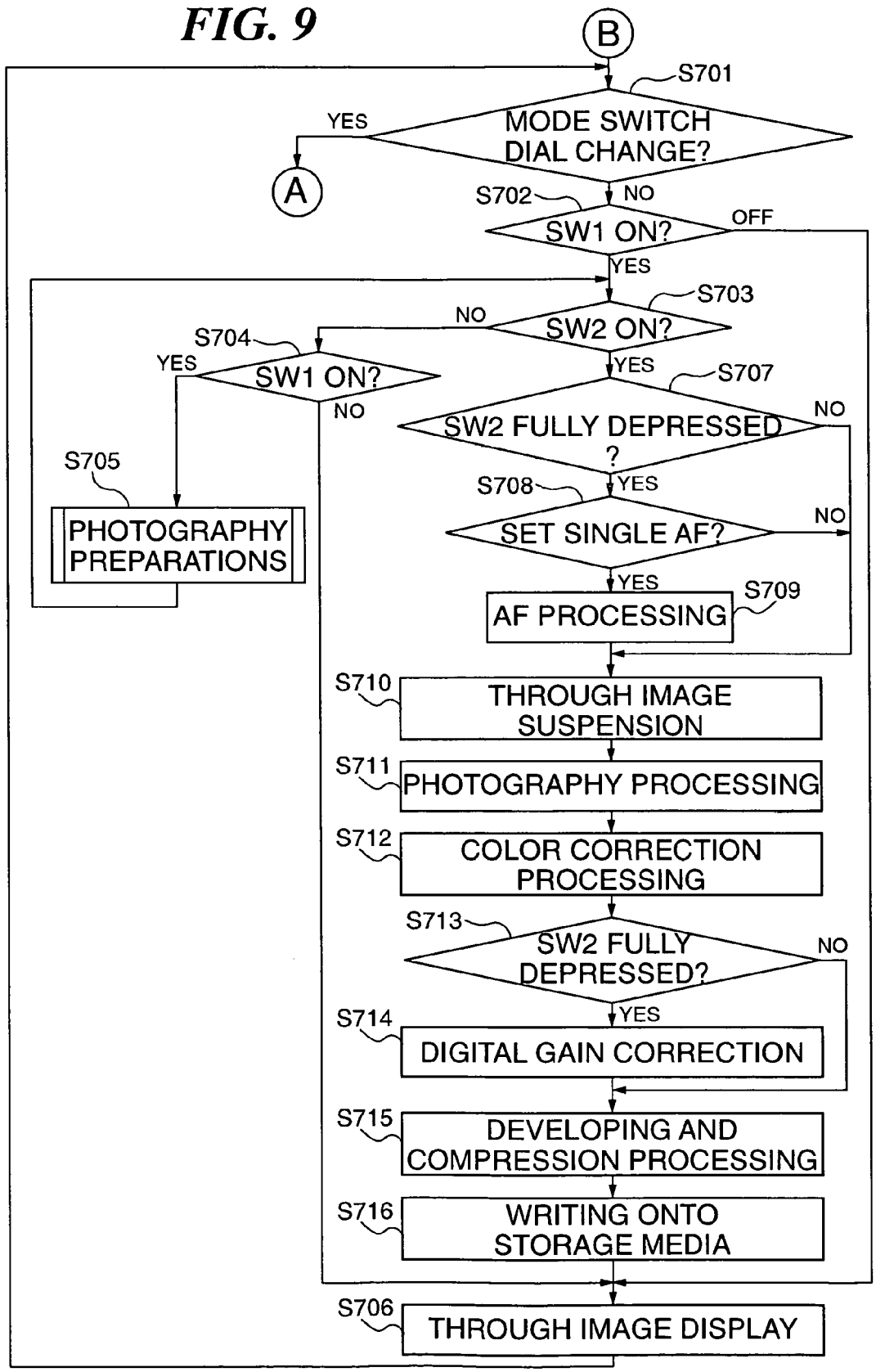
FIG. 9 is a flowchart showing a further continued part of the main routine in FIG. 1, i.e. processing when release operation members of the image pickup apparatus in FIG. 1 are consecutively pressed.

In this way, according to the sequence shown in FIG. 9, even when the shutter switch SW1 and shutter switch SW2 are consecutively pressed, photography sequence is changed so as to increase the time period required for photography, to thereby make it possible to prevent losing the chance to photograph. Moreover, even when the brightness of the subject changes just before the shutter switch SW1 is pressed, a photographic image with the brightness adjusted to a proper level can be obtained through the digital gain correction.

It should be noted that the above described control methods can be implemented by storing programs according to the above described flowcharts of FIGS. 2 to 5 and 9 and executing the programs.

The present invention is not limited to the above described embodiment, and may either be applied to a system composed of apparatuses or to a single apparatus.

It is to be understood that the object of the present invention may also be accomplished by supplying a system or an apparatus with a storage medium in which a program code of software which realizes the functions of the above described embodiment is stored, and causing a computer (or a CPU or MPU) of the system or apparatus to read out and execute the program code stored in the storage medium.

In this case, the program code itself read from the storage medium realizes the functions of the embodiment described above, and hence the program code and the storage medium in which the program code is stored constitute the present invention.

Examples of the storage medium for supplying the program code include a floppy (registered trademark) disk, a hard disk, a magnetic-optical disk, a CD-ROM, a CD-R, a CD-RW, a DVD-ROM, a DVD-RAM, a DVD-RW, a DVD+RW, a magnetic tape, a nonvolatile memory card, and a ROM. Alternatively, the program may be downloaded via a network.

Further, it is to be understood that the functions of the above described embodiment may be accomplished not only by executing a program code read out by a computer, but also by causing an OS (operating system) or the like which operates on the computer to perform a part or all of the actual operations based on instructions of the program code.

Moreover, it is to be understood that the functions of the above described embodiment may be accomplished by writing a program code read out from the storage medium into a memory provided on an expansion board inserted into a computer or in an expansion unit connected to the computer and then causing a CPU or the like provided in the expansion board or the expansion unit to perform a part or all of the actual operations based on instructions of the program code.

CROSS REFERENCE TO RELATED APPLICATION

This application claims priority from Japanese Patent Application No. 2004-047798 filed Feb. 24, 2004, which is hereby incorporated by reference herein.

What is claimed is:

1. An image pickup apparatus comprising:
an image pickup unit that picks up a subject image;
a focus detection control unit that carries out focus detection control on the subject image in a plurality of control modes which include a first control mode in which the focus detection control is carried out once every time a photography preparation operation is carried out, and a second control mode in which the focus detection control is consecutively carried out a plurality of times every time the photography preparation operation is carried out;
a feedback exposure control unit that repeatedly carries out feedback exposure control of the subject image so as to maintain proper brightness of an image obtained from said image pickup unit; and an execution control unit that controls said feedback exposure control unit to carry out the feedback exposure control before executing the focus detection control when said focus detection control unit carries out the second control mode and to not carry out the feedback exposure control before executing the focus detection control when said focus detection control unit carries out the first control mode.

2. An image pickup apparatus according to claim 1, further comprising a switch that instructs a start of photography operation, and wherein said execution control unit is operable when said switch instructs the start of photography processing.

3. An image pickup apparatus according to claim 1, wherein said execution control unit controls said feedback exposure control unit to carry out the feedback exposure control after said focus detection control unit carries out the focus detection control when said focus detection control unit carries out the first control mode.

4. An image apparatus according to claim 3, further comprising a switch that instructs a start of photography operation, and wherein said execution control unit is operable when said switch instructs the start of photography processing.

5. An image pickup apparatus comprising:

an image pickup unit that picks up a subject image;

a focus detection control unit having a first control mode in which the focus detection control is carried out once every time a photography preparation operation is carried out on the subject image, and a second control mode in which the focus detection control is consecutively carried out a plurality of times every time the photography preparation operation is carried out on the subject image;

a feedback exposure control unit that repeatedly carries out feedback exposure control of the subject image so as to maintain proper brightness of an image obtained from said image pickup unit; and an execution control unit that is operable when said focus detection control unit carries out the focus detection control in the first control mode, to control said feedback exposure control unit so as to carry out the feedback exposure control after executing the focus detection control, and operable when said focus detection control unit carries out the focus detection control in the second control mode, to control said feedback exposure control unit so as to carry out the feedback exposure control before executing the focus detection control.

6. A method of controlling an image pickup apparatus comprising an image pickup unit that picks up a subject image, a focus detection control unit that carries out focus detection control on the subject image in a plurality of control modes, which include a first control mode in which the focus detection control is carried out once every time a photography preparation operation is carried out, and a second control mode in which the focus detection control is consecutively carried out a plurality of times every time the photography preparation operation is carried out, and a feedback exposure control unit that repeatedly carries out feedback exposure control of the subject image so as to maintain proper brightness of an image obtained from the image pickup unit, comprising:

a selection step of selecting one control mode among the first and second control modes of the focus detection control unit; and a determination step of determining whether to carry out the feedback exposure control by said feedback exposure control unit after or before executing the focus detection control according to the first or second control mode of the focus detection control unit selected in said selection step.

7. A computer-readable medium storing a computer program for controlling an image pickup apparatus comprising an image pickup unit that picks up a subject image, a focus detection control unit that carries out focus detection control on the subject image in a plurality of control modes, which include a first control mode in which the focus detection control is carried out once every time a photography preparation operation is carried out, and a second control mode in which the focus detection control is consecutively carried out a plurality of times every time the photography preparation operation is carried out, and a feedback exposure control unit that repeatedly carries out feedback exposure control of the subject image so as to maintain proper brightness of an image obtained from the image pickup unit, the computer program comprising:

a selection instruction for selecting one control mode among the first and second control modes of the focus detection control unit; and a determination instruction for determining whether to carry out the feedback exposure control by said feedback exposure control unit after or before executing the focus detection control according to the control mode of the focus detection control unit selected according to said selection instruction.

8. A computer-readable storage medium storing a computer program for executing a method of controlling an image pickup apparatus comprising an image pickup unit that picks up a subject image, a focus detection control unit that carries out focus detection control on the subject image in a plurality of control modes, which include a first control mode in which the focus detection control is carried out once every time a photography preparation operation is carried out, and a second control mode in which the focus detection control is consecutively carried out a plurality of times every time the photography preparation operation is carried out, and a feedback exposure control unit that repeatedly carries out feedback exposure control of the subject image so as to maintain proper brightness of an image obtained from the image pickup unit, the method comprising:

a selection step of selecting one control mode among the first and second control modes of the focus detection control unit; and a determination step of determining whether to carry out the feedback exposure control by said feedback exposure control unit after or before executing the focus detection control according to the control mode of the focus detection control unit selected in said selection step.

* * * * *